Feb. 28, 1967   D. F. OTHMER   3,306,346
METHOD FOR COOLING VOLATILE LIQUIDS
Filed Dec. 3, 1962   2 Sheets-Sheet 1
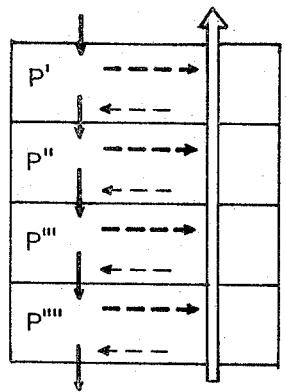
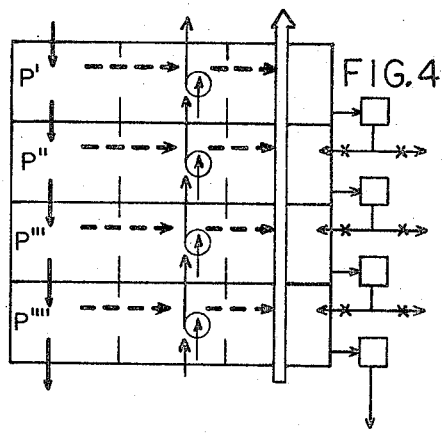
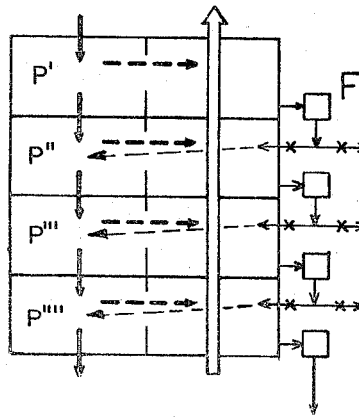
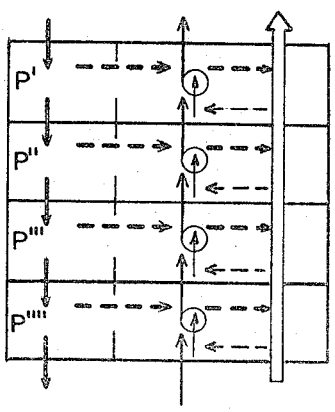
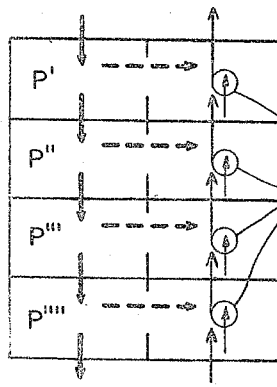
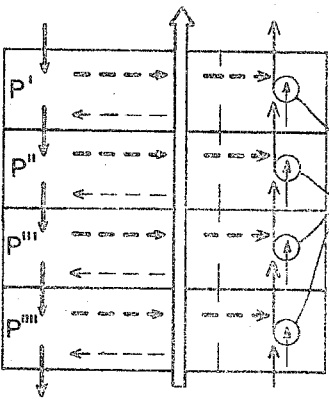
INVENTOR.
DONALD F. OTHMER Feb. 28, 1967   D. F. OTHMER   3,306,346
METHOD FOR COOLING VOLATILE LIQUIDS
Filed Dec. 3, 1962   2 Sheets-Sheet 2

INVENTOR.
DONALD F. OTHMER

United States Patent Office 3,306,346
Patented Feb. 28, 1967

3,306,346
METHOD FOR COOLING VOLATILE LIQUIDS
Donald F. Othmer, Coudersport, Pa.
(333 Jay St., Brooklyn, N.Y. 11201)
Filed Dec. 3, 1962, Ser. No. 241,721
12 Claims. (Cl. 165—1)

This invention relates to the cooling of one volatile liquid by transfer of heat to another liquid (not necessarily volatile under the operating conditions) in counter-current stages, utilizing a flash vaporization and consequent cooling of the volatile liquid in each of a number of stages. There is involved a multiplicity of successive flash evaporations which remove heat from the volatile liquid and consequent successive condensations of the vapors so formed, either by direct contact with the surfaces exposed by a second liquid or upon heat transfer surfaces past which the secod liquid is passing in the usual heat transfer relation, but in reverse order of the stages, i.e., countercurrent to the flow of the volatile liquid.

A common liquid requiring such cooling is water, either in pure form or as a solvent for other liquids or solids. Water or aqueous solutions may thus be cooled as the first liquid; and water or its solutions may also be the second liquid, which is heated by this process.

However, this method of heat interchanging is not limited to water; and other volatile liquids, either in pure form or as a solvent for solids or other liquids may be cooled, as the first liquid, or heated as the second liquid. The second liquid is, however, not necessarily the same as the first and may not even be volatile. The volatile liquid being chilled may be a mixture of two more volatile liquids, so that the mixture evaporates with a different composition; and as it travels from stage to stage, the composition of the cooling and evaporating solution may change—but does not necessarily change as will be shown hereinafter. The volatile liquid or mixture of liquids may also have in solution various non-volatile solutes (either liquid or solids).

In any case, the volatile solvent evaporates to give vapors which are condensed. If there is an "open condensation," i.e., directly on surfaces of the second liquid which is being heated, the condensate is necessarily removed from the stream of the first liquid flowing. If there is "closed condensation," i.e., on a metallic heat transfer surface, on the other side of which circulates the second liquid while being heated, the condensate may or may not be immediately returned to the first stream of liquid being chilled, depending on other requirements of the processing. Thus, the condensate may be allowed to return immediately to the stream, and this will be most effective in chilling this first liquid, or it may be separately handled, as hereinafter indicated.

In some cases, the volatile liquid may be more or less pure, but in other cases it may contain a large amount of solids in solution or in suspension, or it may contain tarry materials or other scale-forming constituents which tend to scale on ordinary heat transfer surfaces. Nevertheless, it is desired to recover the heat therefrom; and this may be done by the vaporization-condensation relationship to be described hereinafter, particularly when there is a relatively large number—six to ten or more—of successive stages of such vaporous heat interchange.

In every case of this invention, it is desired to flash-vaporize a greater or lesser part of the volatile liquid in successive stages, and to utilize the heat of vaporization (i.e., heat of condensation) in another part of the same stage, and with successive stages in counter-current relation to the flow of the cooler liquid.

It has long been the practice in operating flash evaporators to circulate a cyclic stream of liquid which is being heated on a preheating side of a ladder of stages, each of successively higher pressure and temperature. After additional external or virgin heat is supplied in a separate or "prime" heater, the same stream of heated volatile liquid is flash evaporated in the same succession of stages; now passing in turn downwardly in pressure and temperature so that a counter-current relation is established.

However, the present invention is concerned with two streams of entirely different liquids. These two streams may be of different composition of the same volatile liquid, e.g., aqueous solutions of the same solute or solutes in different concentrations. It is not necessary, however, to have the same liquid in these counter-current heat transfer relations. Thus, the streams may be of any two liquids of interest to many different processes, wherein heat transfer is required between the two streams, one of which contains a volatile liquid and is being cooled.

In some cases, it may be found desirable to use *open* condensation, wherein the vapors of the successive flash vaporizations are in direct contact with—and condense on the more or less extended surfaces of—the second liquid, which is being heated. In other cases, it may be desirable to use *closed* condensation, wherein the vapors of the successive flash vaporizations condense on a metallic heat transfer surface on the other side of which passes a counter-current cooling liquid, which is itself being heated.

Furthermore, in some process uses, there may be two liquid streams to be heated while a stream of a volatile liquid is to be cooled. Herein may be used multiple flash evaporations of the first or volatile liquid stream being chilled at successively lower pressures, and with vapors therefrom condensing in each stage simultaneously: (a) by *open* condensation on one liquid stream suitably disposed in each stage and passing in the reverse direction to the first, and (b) also at the same time and in the vapor spaces of the same stages, by *closed* condensation on heat transfer surfaces suitably disposed in each stage on the other side of which passes in the reverse direction still another liquid stream. Thus, direct and open condensation may be utilized to transfer heat from the liquid stream being chilled to a stream of liquid being heated, while *simultaneously* indirect or *closed* condensation is utilized to transfer heat from the liquid stream being chilled to yet another stream of liquid being heated. Both streams being heated by the successive condensing actions of the flash evaporation stages are passing in the same direction and counter-currently to the first stream of volatile liquid being chilled.

Whereas this process may be indicated, as in the figures, by a ladder of stages vertically, with the comparatively warm or hot volatile liquid descending from top to bottom on the left of the ladder, and the cold liquid, or liquids, ascending from the bottom to the top on the right side of the ladder, this is to be regarded merely as a diagramatic method of illustrating a flow sheet. It is also possible to use other arrangements of the stages of such a ladder, whether concerned with open or closed condensation; and a horizontal embodiment is often preferable; or one stream (e.g., the volatile one), may be horizontally disposed, while the other may be disposed vertically or even at some other angle than 90% to the flow line of first mentioned stream.

As mentioned, however, the present invention involves the chilling of one liquid from the flash evaporation processes heretofore utilized and as normally practiced in that two liquids are used herein; and the prime purpose is of heat-exchanging rather than concentration or evaporation of the solution. While some concentration of the liquid being chilled may be experienced in some, but not all embodiments of the present invention, this is not the principal purpose; and the process design is toward chilling the liquid instead, with consequent differences in construction and operation of the equipment used. Thus, the present invention is not concerned with preheating the same liquid stream which is then to be flash evaporated, nor in a recycle time and again thereof, as in the usual multiple flash evaporation system.

There has now been found that a heat transfer system may be designed and operated for interchanging heat between liquid streams; and often the one to be cooled is originally at the ambient temperature. In some cases the condensate formed by closed condensation on a metallic heat transfer surface may be maintained as a separate stream or streams; in many cases, however, the condensate formed has no particular utility as such, since only the heat transfer phenomena is desired. Then the condensate may be returned immediately to the liquid from which it was formed and in the same stage, or in stages of subsequently lower pressure to the stream of liquid being cooled by flash evaporation.

Thus, in the present invention, in those cases where pure liquid or a solution is being evaporated for heat-transfer relation, the condensate may be immediately returned to the stream being chilled, without maintaining a separation thereof. This is obviously in direct antithesis to the flash evaporation system where the very purpose of the process is the separation of the condensate (or distillate) which is being formed by flash chilling and evaporation of the solution for the purpose of obtaining a pure distillate and a more concentrated solution. Obviously the equipment for the present invention of chilling a liquid stream is much simpler when the condensate does not have to be kept separate. Thus, in a horizontal system, with evaporation proceeding from a liquid in a stage below and with vapors condensing on a tube above, the condensate would fall back directly from the tube into the liquid in the same stage below. If the ladder of stages were vertical, the same result would be achieved by having the vertical condensing and heating tubes passing directly through the vapor space of the successive stages with the condensate running down therefrom to the floor of the stage to join the liquid being cooled.

Many of the more useful applications of this method of cooling a volatile liquid are for heat recuperation at temperatures below the normal boiling point of the liquid; and in other cases, to be discussed hereafter, heat recovery is of no importance since it is desired to cool a liquid to a temperature below usual, ambient conditions, if by a cooler liquid, with saving of refrigeration effect.

In the open condensation used in this method, the equipment may partake of the designs satisfactorily used for many years for spray condensers or film condensers, following either evaporators for concentrating, or steam engines or turbines as prime movers. With such condensers, however, there is only one stage; but the aim is the same as in the present method, i.e., the minute subdivision of the water into droplets, films, or streams having large surface area exposed to the vapor for maximum ease of heat transfer and condensation.

In the cooling of the volatile liquid by flash evaporation of part thereof in a series of stages of successively lower pressures, the temperature of the liquid leaving each stage will correspond closely with its vapor pressure on that stage due to the great tendency for an equilibrium to be reached in such a phenomenon. The flash evaporation may be regarded as adiabatic; and the decrease in sensible heat which would be experienced by the liquid in being cooled from the temperature of one stage to the temperature of the next lower stage is equal to the latent heat of evaporation of the amount of the stream which is vaporized which is also the amount of vapors formed. Similarly, of course, this vaporous heat is transferred on condensation to warm the stream of the cooler liquid.

The pressure of the vapors formed in the flash evaporation will be very slightly greater out of the stream being cooled than it is out of the open stream being heated. However, after considering the minor friction losses in moving the vapor from one side of the stage to the other, it has been found through experiments, wherein warm water is the stream being cooled on one side and colder water is the stream being heated on the other side that this difference of the vapor pressures of the two open streams does not need to be more than one or two millimeters of mercury; and the temperature difference may be as low as a tenth of a degree Fahrenheit. Thus, it is possible to obtain a very close temperature of approach between the two streams by open condensation. However, it is not possible to cool the volatile liquid by closed condensation to as close a temperature of approach to that of the cooling stream in the tubes on the same stage, since there will be, of course, the usual temperature of approach to be expected in the design of any tubular condenser.

Still another useful variation of the present method is found in those cases where the liquid being cooled is a pure volatile material—or a mixture of two or more pure volatile materials. Here, for some processing uses which will be shown hereinafter, the liquid being cooled will be completely evaporated in a single pass through the several stages so as to leave no residue. The vapors will be removed from the stream at each of the several stages in a single pass, with the last of the liquid being completely evaporated from the stage of lowest pressure. Additional heat may be supplied to the liquid being cooled during the process to make possible this complete vaporization, also additional heat may be removed from the cooling stream, particularly, if it is operating by open condensation.

Also, it may be noted that in cooling the liquid by multiple flash evaporation and open condensation, using a stream of cooler liquid, it may be desirable to have both liquid streams flowing downwardly. Stages on the side of the volatile liquid being cooled will thus go from top to bottom in order of decreasing pressure, while the reverse will be the case for the corresponding stages where the cooling liquid is being passed. The vapor connections will thus cross each other, while the liquid connections will always pass liquids downwardly.

Usually, but not necessarily, as will be shown hereinafter, the temperature of the volatile liquid being cooled is higher as it leaves each stage than is the temperature of the liquid being warmed as it leaves the same stage.

While above and hereinafter reference is made to a cooling liquid which is being warmed in the process of chilling the volatile liquid, it should be noted that exactly the same effect may be achieved when closed condensation is used by circulating any fluid of lower temperature through the tubes on which the vapors of the volatile liquid are being condensed. This fluid might be, instead of a liquid as mentioned, a gas, a gas-liquid mixture, a mixture of two immiscible liquids, or a mixture of gas-solid, or liquid-solid. For ease of expression only, the term "liquid" is used.

*Objects*

Among the objects of the inventions may be listed:

(1) The minimization of the cost of a heat exchanger for chilling a volatile liquid by entire elimination of metallic heat transfer surface, wherein there are successive flash evaporations of the volatile liquid and open condensations of the vapors so formed on surfaces of a liquid being heated thereby and passed in counter-current thereto;

(2) The minimization of the cost of a heat exchanger for chilling a volatile liquid, wherein advantage is taken of the much greater heat transfer coefficient of condensation of vapors of the volatile liquid on a metallic heat transfer surface than of the liquid, itself, if it were in contact, at the same temperature, with the metallic heat transfer surface;

(3) The chilling of a volatile liquid in a multiple flash evaporation and with either open or closed condensation, with separate streams of independent masses and particularly heat capacities, wherein there may be designed or utilized a mass of second liquid not fixed in amount to the mass of the liquid being chilled, as it is in the case of a multiple flash evaporator operated for the purpose of evaporation;

(4) The chilling of a solution, wherein a volatile liquid is the solvent, from an ambient temperature by successive flash evaporation of the volatile liquid, with counter-current heat exchanging to a second and different liquid, wherein some concentration of the solution is obtained by removal of the condensate in the successive condenser stages;

(5) The chilling of a volatile liquid by successive flash evaporations, wherein the vapors so formed in each flash evaporation are used to heat by open condensation one liquid stream and by closed condensation another liquid stream;

(6) The chilling and simultaneous fractionation of a mixture of volatile liquids, one of which has a greater volatility, by a series of flash evaporations wherein the condensates of the vapors in each flash evaporation are removed, thus stripping more or less completely the more volatile liquid from the mixture while using the heats of condensation of the vapors in each stage to heat counter-currently another liquid stream.

(7) The chilling of a stream containing a volatile liquid below the temperature of the available cooling water by a series of flash evaporations and counter-current open condensations on another stream of liquid having lower equilibrium vapor pressures of the same volatile liquid in each of the respective stages.

Description of the figures

FIGURE 1 is a schematic flow sheet of the application of the method of cooling a volatile liquid in a multi-stage flash evaporation, conducted on the left side of each of a series of stages, with vapors passing to the right side where they are condensed on tubes inside of which is passing a fluid flowing in counter-current, with condensate being returned to the liquid being cooled.

FIGURE 2 is a similar multi-stage evaporation for cooling of a volatile liquid, wherein the condensate of the vapors is removed from each stage and separated by a steam trap or similar device for discharge from the system or for return to the liquid being cooled at the next lower stage.

FIGURE 3 is a similar multi-flash evaporation for cooling of a volatile liquid, wherein the vapors formed are condensed on an open stream of liquid in each stage flowing in counter-current.

FIGURE 4 is a combination of the operations of FIGURE 2 and of FIGURE 3 within the same series of stages.

FIGURE 5 is a combination of the operations of FIGURE 3 and of FIGURE 1, except that the condensate is being returned to the stream of liquid which is in open flow for condensation of vapor.

FIGURE 6 is a combination of the process of FIGURE 1 and of FIGURE 3.

FIGURE 9 has, in the upper line, profile of the temperatures of the volatile liquid being cooled in the respective stages; and in the lower line, the temperatures profile of the liquid being heated by open contact and condensation as in FIGURE 3.

FIGURE 10 is a logarithmic plot of the concentration of alcohol in a volatile liquid being cooled in several stages, against the number of stages.

Flow sheets of process variations

In the several figures given as explanatory of this method for cooling a volatile liquid, no intent is made to specify or diagram any particular physical apparatus, since all equipment parts are of standard construction and readily understandable and utilized by those skilled in the art. The figures are intended simply as flow sheets of streams of liquids and vapors, with no limitations as to the physical arrangement or construction of the equipment itself, except that such equipment and its arrangement will be such as to carry out the flows and functions described. The vessels are totally enclosed, with appropriate piping and fittings connected thereto, all suitably designed for operation at the necessary temperatures and positive pressures or vacua of the respective parts of the system.

In the usual case, there may be at least six stages and probably many more, depending on the temperature range of cooling of the volatile liquid, and also on the degree of the counter-current action which is desired. In the figures, for simplicity, only four stages are shown for each of the several cases, and while four stages may be adequate in some cases, more will always give a more efficient operation.

While the stages are shown as being vertically disposed within a single shell for all stages and for both heating and cooling sides of each stage, the arrangement may be otherwise, with separate vessels for each stage—or even for each side of each stage, with external individual piping connections.

Figure 11:
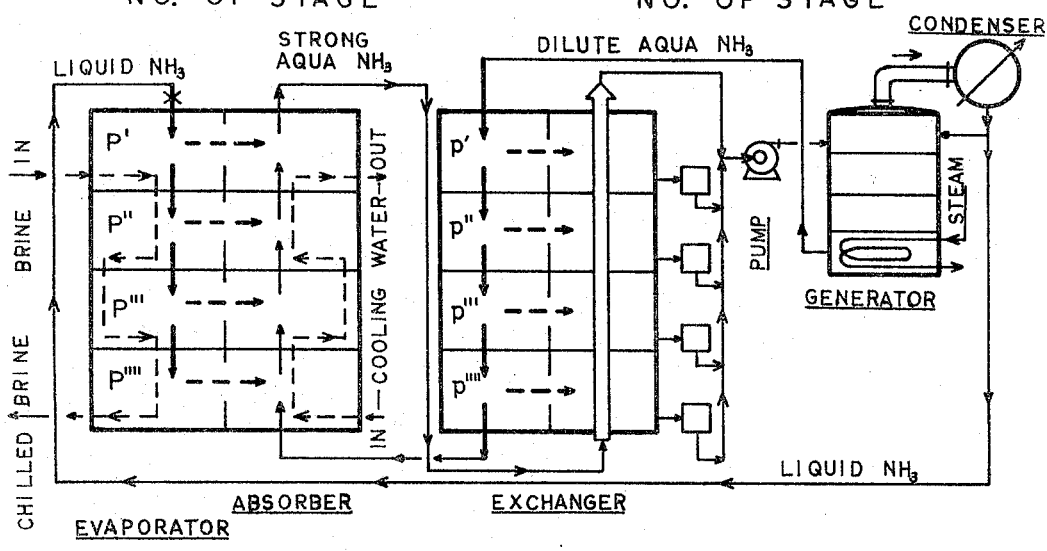
FIGURE 11 is a diagrammatic representation of a multi-flash and a multi-absorber refrigeration system, combined with a multi-flash heat exchanger and the usual generator, condenser and pump for the absorbing liquid from the lower pressure of the absorber to the highest pressure of the generator.

Before discussing the individual figures, there may be described the general methods of depicting vessels, flows, etc., in FIGURES 1 to 6. Succesive stages of the ladder of stages are always indicated by four rectangles within an external shell. The top stage of the ladder is one of highest temperature and pressure; and the lower one is the one of lowest temperature and pressure, with intermediate ones having intermediate levels of temperature and pressure. In the FIGURES 1 to 6 and 11, the pressure in the top stage is, in each case, indicated by $P'$, which is the highest pressure; the pressure in the next to the top stage is indicated by $P''$, the next lower pressure; the pressure in the third stage from the top is indicated by $P'''$, a still lower pressure; and the pressure in the fourth stage from the top, the bottom one, is indicated by $P''''$, which is the lowest pressure. Any larger numbers of stages would have the pressures graduated from top to bottom in the same way. Similarly, the different pressures of the heat exchanger series of stages in FIGURE 11 are shown by $p'$, $p''$, $p'''$, and $p''''$. The heavy arrows on the left of FIGURES 1 through 6, forming a line downwardly, represent the volatile liquid to be cooled entering the top stage, flashing to come to equilibrium with conditions thereon, with part of the volatile liquid which is being cooled evaporating to give vapors. The heavy arrows indicate the volatile liquid passing downwardly to make an entrance to the next stage, as it exits from the higher one. It is again partially cooled by flash evaporation as it has been in the higher stage, and thence passes downwardly stage by stage.

Methods of control of flow of the volatile liquid from stage to stage are standard, and might include a steam trap of adequate capacity to allow liquid to flow, but to stop vapor flow, a float valve or other standard mechanism, the design of which is not pertinent to the present invention, could also be used.

Vapors which are formed in the flash evaporation are shown by upper heavy-line arrows passing from left to right. In those cases (e.g., FIGURE 1), wherein closed condensation is utilized and the condensate formed is to be returned to the stream of volatile liquid being cooled, an arrow of a dashed light-line on each stage indicates flow of the condensate formed by closed condensation back to the left to join the main stream of liquid being cooled.

In those cases where there is closed condensation (e.g., FIGURES 1 and 2), a double-line arrow extending vertically through all the stages on the right side indicates the closed liquid flowing for the purpose of condensing the vapors, and hence removing heat from the volatile liquid being cooled.

In those cases where there is closed condensation; and it is desired to remove the condensate stream instead of returning it back to the main body of liquid being chilled on the same stage (e.g., FIGURES 2 and 4) small squares to the right of each stage indicate an apparatus such as a standard steam trap, wherein the condensate is separated and removed. The condensate then is discharged downwardly into a horizontal T with crosses, which indicate valves, to allow its flow either to right or left. If the valve on the right is closed and the one on the left is opened, the condensate flows back to the next lower stage where it would flash and join the condensate formed on that stage by closed condensation. If the valve on the left is closed and the one on the right is opened, the condensate passes out of the system.

In those cases where there is open condensation (e.g., FIGURE 3), the stream of liquid being heated is indicated by a series of light-line arrows passing vertically on the right from stage to stage. Since each higher stage is at a progressively higher pressure, a pump or similar device is necessary to force the liquid into the next higher stage. In FIGURES 3, 4, 5, and 6, this is indicated by a diagram of a centrifugal pump, the small circle with suction from the bottom of the condensing zone shown by the arrow to the center, and the vertical discharge by the tangential arrow upwardly to the next stage. These are labelled "Pumps" in FIGURES 3 and 6. The same pumps would be used but are not indicated in the absorber of FIGURE 11.

In those stages where there is closed condensation (e.g., FIGURE 2) wherein the condensate is desired to be kept separate from the liquid stream being cooled, or where there is open condensation (e.g., FIGURE 3) it is necessary to divide each stage into a vaporization compartment and a condensation compartment. This is indicated by the vertical wall, broken to allow the passage of vapors. This opening may include a steam separator or demister to prevent entrainment of droplets of liquid coming from the vaporizing liquid, or be otherwise constructed to maintain liquids separate on the two sides of the stage but to allow ready flow of vapors with no important pressure drop from the left to the right of each stage.

In those cases where there are two separate streams of liquid being cooled (e.g., FIGURES 4, 5 and 6), the functions indicated in FIGURES 1, 2 and 3 are also delineated in the same manner. In these cases, for purposes of economy and simplicity of control, it may often be preferable to have the operation of what amounts to two heat exchangers in a single unit, as shown in FIGURES 4, 5 and 6. In FIGURES 4, 5 and 6, the basic intent is that, for particular purposes in specific processes, there may be two different streams of liquid to be used in cooling the same stream of volatile liquid which is to be chilled, always by flash evaporation. FIGURES 4, 5 and 6 then are combinations of the systems of FIGURES 1, 2 and 3, taking two of each of the cooling steps indicated in FIGURES 1, 2 and 3 for each of the respective operations of FIGURES 4, 5 and 6.

In some cases, there is desired to obtain a balanced heat-loading of the liquids flowing in the two streams of a process; in other cases, the terminal temperature may be the important consideration, and the quantities of heat are then calculated as dependent thereon.

One example might be a freezing process for desalination of sea water, wherein the volatile liquid being chilled would be fresh sea water. One of the cold liquid streams available would be the concentrated brine which has been formed in the desalination operation, and which is at substantially its freezing point, while the other cold liquid stream would be the substantially pure water produced, which is also at its freezing point. In such a system it would be desirable to utilize the refrigerating effect of the two cold streams coming from the process to pre-chill the sea water coming in as feed. In this case, the sum of the two exiting streams should usually be that of the entering stream. Other similar cases may be worked with in other processes.

The details of the individual flow sheets may now be considered:

In FIGURE 1 is diagrammed a ladder of stages, the highest pressure stage being at the top; the lowest pressure stage at the bottom. The volatile liquid to be chilled is passing downwardly from the upper stage to each successively lower pressure stage in the evaporation zone on the left, and the second liquid which is removing the heat and is being heated thereby is passing upwardly on the right in an enclosed tubular system extending throughout the entire height of all of the stages of the ladder. The left stream of liquid, at the highest temperature, which in many cases may be the ambient temperature, enters at the top, and passes to the lowest temperature at the bottom. It is being flash evaporated in each stage as it descends.

Vapors from each flash evaporation pass from the left side of the corresponding stage to the right, as indicated by the upper arrows (heavy-dashed lines) pointing to the right. On the right side, there is one or more tubes (indicated by a double line) passing vertically through the successive stages. The liquid being heated is passed upwardly through the tubes in a closed relation to the vapors of each stage. The vapors condense on the tube, and the condensate collects on the bottom of the stage. The arrow, light-dashed line, passing from right to left, indicates the passage of condensate on each stage, the condensate re-joining the main body of the liquid being chilled which passes to the stage below, in the same amount and concentration as that entering the stage.

FIGURE 2 corresponds more nearly to that of the usual flash evaporator set-up, in that there is a progressive concentration of the volatile liquid being chilled. In this case, however, two different liquid streams are processed merely for their counter-current heat interchange relation, rather than a single liquid stream being first pre-heated, then flash evaporated, as is familiar in the evaporation and concentration art. Thus, these liquid streams may be as independent in relative amounts as in any other heat exchanger, and may be quite different in nature; whereas in the flash evaporator for concentration purposes, the amounts and nature are dependent entirely on the narrow conditions of that particular operation, since the right side would carry *the single liquid* stream being processed (and on this side being preheated), while on the left side, it is then being concentrated.

Again, in FIGURE 2, the liquid in the left stream of arrows passing downwardly stage by stage decreases in temperature from top to bottom by open flash vaporization in each stage, and run down to the next stage where the operation is repeated.

The vapors formed in the flash evaporation pass from left to right, through a demister if desired (not shown)

and over a dividing partition which prevents mixing of the liquid being chilled on the left with the condensate formed on the tubes on the right. The right liquid stream, enclosed in one or more tubes, goes upwardly, being heated through the wall of the tube or tubes by the condensing vapors, in a condensation-heating relationship.

In FIGURE 2, the condensate from each stage is withdrawn from that stage on the right hand side, as indicated by the short external arrows. This condensate is then passed through a steam trap (represented by the small squares external to the stages) and then it may be passed to waste through the valved lines discharging horizontally to the right below each trap. This would be the simplest way to discharge the stream in question. If the prime object is to chill the volatile liquid stream on the left; and this is to be done using the minimum of the liquid stream on the right (or, saying it another way, if it is desired to utilize to the maximum the chilling effect or capability for cooling of the right or cold liquid stream), the discard of the condensate from each trap is obviously the most efficient system, since the sensible heat therein is thus removed once and for all from the system, with a minimum heating effect on the stream on the right side.

If, however, the heating of the liquid stream on the right side is equally important to the chilling of the stream on the left, or, if it is desired to utilize the heat of the stream on the left to the maximum, this condensate on a stage is allowed to pass through the horizontal line to the left, below the trap by opening the left valve and closing the right valve. It then enters the next low stage in the evaporation zone and, being at a higher temperature and pressure, flashed partially to preheat further the liquid in the tube. This is the standard practice in flash evaporation for concentration purposes, wherein a single liquid is being recycled through both sides—while herein the liquid being heated in the closed stream on the right is different from that being chilled on the left.

FIGURE 3 shows the flash evaporation and an open condensation in each stage. In each case, the mechanical design of the system is such as to present as large surface areas of the liquid in question as may be devised conveniently and economically. Sprays of the liquid in the vapor space, cascading in shallow pans and over weirs are some of many possible means. Usually, but not necessarily, the same liquid is the solvent or pure liquid in both streams; but this is not essential in some process designs. The liquid being chilled again descends from the highest temperature at the top, left, to the lowest temperature at the bottom of the ladder. This may be an aqueous solution, for example, or pure water, which then vaporizes, with vapors passing across from left to right in each individual stage, as shown by the horizontal arrows.

Again, in FIGURE 3 as in FIGURE 2, there may be a baffle or demister to prevent liquid entrainment from left to right; and necessarily there is a dividing partition to keep the two liquid streams separate. On the right side, the liquid is forced to climb the ladder from stage to stage, usually by means of a separate pump for each stage, which then may be connected to a system for subdividing the liquid into small droplets (spray nozzles) or films (overflow weirs or notches) to provide a large surface area of liquid in the vapor space for condensation and heat transfer. The condensate here is necessarily additive to and inseparable from the stream flowing or forced upwardly from stage to stage, on the right.

(In those cases where the stream being heated on the right is insoluble (e.g., an oil) with the stream being cooled on the left, (e.g., water or an aqueous solution), the condensate (in this case, pure water) may, of course, be separated due to the mutual immiscibility. However, no figure is included wherein the combined stream of two immiscible liquids would be withdrawn in this case, if desired, to a decanter for such separation of two liquids and discharge of the condensate liquid therefrom, with return of the principal stream.)

Wherein the purpose may be served by the diagram, or of the process shown in FIGURE 3, for the ordinary vapor-reheat process already known, it has been heretofore utilized and described only for those cases wherein the hot liquid is flash evaporating to be concentrated, and/or to produce a pure water condensate. This is a very special case of the much broader field now described; and it may, or may not, be the case in the present invention, wherein the utilization of the process is generally for heat transfer and cooling of a warmer volatile liquid by a cooler one. A choice of liquid for the right stream, which is being heated in chilling the left stream, is possible, and it may in some cases be immiscible with the volatile liquid being chilled, and non-volatile under the conditions of the operation, depending on the liquid stream available to be handled. Of possibly greater import is the fact that its amount may also be varied (as long as it is adequate to do the desired cooling), while in the vapor-reheat evaporation, neither the liquid in the stream on the right, nor its amount may be varied from the limitations of that technique (since it must be the same liquid as the condensate and must be appropriate in amount to balance the conditions of evaporation).

In FIGURE 4, again the flash evaporation takes place in stages on the left side of the ladder; and vapors are passed to two different parts of each stage, in the middle and on the right side of the ladder—the middle stream corresponding to the right side of FIGURE 3—and the stream on the right side of FIGURE 4 corresponding to the right side of FIGURE 2. In this case, it is assumed that there are two different streams of liquid which are to be heated, while chilling the one stream of volatile liquid. In one case the condensate, e.g., of water from a solution being concentrated by the flash evaporation on the left, may be added directly to the middle stream by open condensation. On the right side, there is a stream with which it may be assumed it is not desirable to use open condensation, which is being preheated also. Herein the combined heat exchanger is cooling the left stream by multiple flash evaporation, and passing the vapors so formed partly to open condensation on the center stream and partly to closed condensation on the tubes carrying the right stream; i.e., there is a combination of the functions of FIGURES 2 and 3.

In FIGURE 4, that part of the condensate formed on the tubes by closed condensation is shown as being collected in external traps; and, by opening the valves on the left and below the traps, this is separately flashed to successively lower stages. Alternately, as mentioned under FIGURE 2, this condensate may be discarded from the system by opening the valves on the right and below the traps.

FIGURE 5 also has two streams being heated in chilling the stream on the left; one is accomplishing open condensation (as in FIGURE 3), and one is accomplishing closed condensation (as in FIGURE 1). In this case, the condensate from the closed condensation on the right is combined with the liquid stream being circulated for the open condensation in the center.

FIGURE 6 shows still another possible combination of two cooling streams, one working by open condensation, and one working by closed condensation. This is the combination of the cooling streams as in FIGURE 1 and in FIGURE 3 to remove the heat from the stream being chilled by flash evaporation. In this case, the condensate from the closed condensation is returned directly to the stream being chilled, while that from the open condensation adds to that stream.

Two other possible flow sheets are not shown in the figures since they are quite obvious. There might be two or more different streams of liquid being heated, and this could be by the methods of FIGURE 1 and/or FIGURE 2, closed condensation, or by method of FIGURE 3 for open condensation. In the case of the streams cooling by closed condensation, little difference is expected in the mechanics or operation; and the total heat effect on each stage will be the sum of those due to each. In the case of two streams of different liquids, both operating by open condensation, the effective partial pressures of the one or more components of the vapors will cause condensation based on the corresponding effective partial pressures out of the open cooling streams. This point will be referred to later.

*Temperature profiles in heat exchangers*

Figure 7:
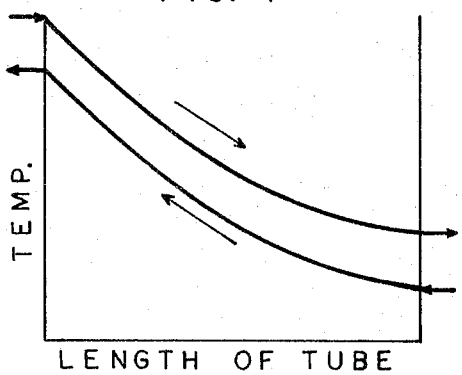
FIGURE 7 is a diagrammatic representation of the profile of temperatures of the two streams of liquid passing counter-currently in the usual type of tubular heat exchanger—throughout the length of the tube.

In the usual heat exchanger specified for cooling a liquid stream by another liquid stream initially at a lower temperature and with a metallic heat transfer surface having one of two liquid streams on either side, the plot of temperature vs. length of tube, as in FIGURE 7, shows a falling curve for the liquid being cooled as it passes throughout the length of tube from left to right, and a rising curve from right to left for the liquid being heated. At each end, the so-called temperature of approach of the streams is the vertical distance between the two curves. These curves are about equi-distant vertically, and their slopes are about the same at any distance throughout the length of the tube for streams having the same heat capacity, i.e., about the same relative volumes if both are water or dilute aqueous solutions. The relative slopes at any distance along the tube will be approximately inversely proportional to the volumes passing in the two streams.

In the case of a flash evaporation in multiple stages (e.g., seven in FIGURE 8) with condensation on a tube passing through the stages and carrying a cooling liquid, the distance along the tube may be divided into equal sections, each representing the length in a stage. Broken vertical lines represent stage boundaries. There will be a staircase arrangement for the plot of the temperature of the warm liquid being cooled, the vertical line of each step being placed diagrammatically near the entrance, or the left point of the length of tube in the stage. This represents the fall in temperature due to the flash evaporation which may be regarded as occurring practically instantly as the liquid enters the stage. The horizontal line of the step represents the substantially constant temperature of the vapors formed and condensing on the surface of the tube.

A curve, or, rather, a number of short curves slightly concave downwardly—one for each step, to give in effect practically a single curve, presents the temperature profile for the liquid being heated inside the tube in passing through the several stages, each of which acts as a short tube condenser.

With an increasing number of stages, the staircase of the temperature profile of the volatile liquid being cooled would have smaller and smaller steps and finally would approach a smooth curve, as would that of the liquid being heated.

Figure 8:
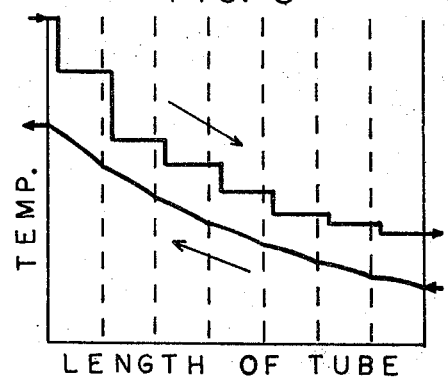
FIGURE 8 is a diagrammatic representation of the temperature profile along the length of a tube carrying the cooling fluid as in FIGURE 1, while being heated, and the profile of the temperatures of the volatile liquid being cooled in the several flash evaporations of the liquid in the successive stages.

FIGURE 8 represents the temperature profiles of the flow sheet of FIGURE 1.

The process of FIGURE 2, however, gives two slightly different variations of FIGURE 8, which would not be detectable in any small-scale drawing. The first would be for the case where the discharge from the traps of FIGURE 2 goes to waste. Because the volume of warm liquid decreases in each stage from left to right, the heights of the vertical lines representing the temperature fall due to flashing, tends to increase. Since the sum cannot be greater than the overall fall in temperature, it follows that a lesser amount of cooling liquid would be required to cool the volatile liquid throughout the same range, as compared to FIGURE 1.

On the other hand, if each trap of FIGURE 2 discharges back into the next lower stage, the riser for the first or high stage of FIGURE 8 will be slightly longer—and subsequent ones will be about the same; and they will compensate among themselves for this greater cooling effect in the stage of highest temperature.

In an open condensation such as that of FIGURE 3, the temperature profiles for the two liquid streams will be as in FIGURE 9. A series of steps is obtained on the temperature profile of the liquid being cooled (upper curve) as with the steps of FIGURE 8, and with the same assumption that the liquid is being cooled instantly just after entrance to a stage by the flashing effect. Another series of steps is obtained for the temperature profile of the liquid being heated, with the vertical lines representing an assumed instantaneous rise in temperature soon after passing into any given stage. It has been found experimentally that the respective temperatures of the two streams leaving a stage of such a flash evaporation and open condensation system are very close to each other (i.e., within about one-tenth of a degree F.), when there is no elevation in boiling point of the volatile liquid due to dissolved materials. In this case, the two sets of stairs almost coincide.

The temperature profile of FIGURE 9 is useful for practical purposes, although it assumes that there is no concentration involved of the volatile liquid. Also, it assumes that the amounts of liquids in each stream are the same throughout the several stages (which would not be quite possible) particularly if the liquid is to be cooled throughout a considerable temperature range. Also, it assumes that the latent heats and sensible heats may be considered constant throughout the temperature range in question. Thus, slight deviations from the temperature profiles indicated for this idealized flow will be found in practice, but are too small to indicate to the small scale of the figure.

At a fixed pressure, the elevation of boiling point of a solution, as it is usually called, is often important. Since the two sides of a stage are at substantially the same pressure, if the liquid being cooled is an aqueous solution and the liquid being warmed thereby is water, the temperature of the solution leaving any stage minus the temperature of the water leaving the same stage is approximately the boiling point elevation. This may be from zero to some tens of degrees Fahrenheit. Thus, the temperatures may be considerably different, and *this difference does not add to the rate of heat transfer*. No similar situation exists in the usual liquid-liquid heat exchange through a metallic surface, wherein vapor pressures do not enter into the consideration.

*Relative heat transfer surfaces*

The amount of heat transfer area required for any given duty by any heat exchanger employing metallic surfaces is proportional to the resistance to the flow of heat or inversely proportional to the coefficient of heat transfer which pertains; and thus the effctiveness of two different heat exchangers is represented directly by the respective coefficients.

One standard heat transfer unit might have the volatile liquid to be cooled flowing outside one or more relatively long tubes at a reasonable velocity parallel to the tube; and the colder liquid which is to do the cooling would flow in a counter-current direction inside the shell. As an embodiment of the present invention, there might be considered a similar long tube or tubes with a number of plates or divisions at right angles which form stages inside the shell, such as in FIGURE 1. The hot volatile liquid can pass from one stage to the next with flash evaporation taking place, the vapors are condensed on each section of the tube due to heat being removed by the same cold liquid passing counter-currently to the flow of the volatile liquid being cooled.

The performance can be determined for these two assumed heat exchangers—the standard one of liquid-liquid heat transfer and the one of present consideration of vapor-liquid heat transfer. However, it is apparent that the conditions inside the tube may be established to be the same for both cases, since design and operation can be made so that the same amount of the cooler liquid flowing inside the tube will have its temperature increased the same amount for both exchangers. Under such conditions, the heat transfer film coefficient inside the tube is identical for the two cases. The variation in the overall coefficient of heat transfer is thus due entirely to the relation between the film coefficient of heat transfer outside the tube for the flowing liquid in the standard exchanger and for the condensation of vapors in the heat exchanger of the present invention.

For such a comparison, the calculated values using the standard equations may show a steam film coefficient of the condensation unit two or three times as great as the coefficients for a liquid flowing at a reasonable velocity in the standard unit. This gives an overall coefficient of one and a half to two times as great for the vapor-liquid unit; and a required area calculated for a given amount of heat transfer equal to the inverse, or one and a half times as much area required for the liquid-liquid heat exchanger as for the vapor-liquid.

In practice, however, due to the greater tendency to lose efficiency of the liquid-liquid exchanger because of fouling, and some other considerations inherent to the theoretical development, the actual area required to cool a given stream has been found to be two and a half to five times as much for the liquid-liquid unit as for the vapor-liquid unit using a flash evaporation and closed condensation method of cooling a volatile liquid. Since the cost of heat transfer surface itself is a very major part of the cost of a heat exchanger, the lowered cost of equipment using the present system of multiple flash vaporizations and condensations is considerable.

While this cost is lessened in arranging one side, i.e., the hot side, of a heat exchanger for cooling the hot liquid so as to have a vapor contact in the closed condensation embodiment of the present invention as compared to the usual liquid contact of a standard liquid-liquid heat exchanger, an even greater reduction in cost is achieved when the cold or condensing side is also arranged to transfer heat through a direct vapor contact with the stream to be heated by open condensation. In this case, metallic heat transfer surface is eliminated entirely.

It is thus impossible to use the respective areas of heat transfer surface for open condensation as a comparison of the cost of equipment with either closed condensation on metallic surfaces, or liquid-liquid heat exchange through metallic surfaces. Usually, the actual volume of vessels for flash evaporation and open condensation are not much greater than about two times that of comparable tubular exchangers, depending on various factors of design peculiar to different conditions. However, the necessary accessories, valves, floats, piping, and pumps add to the cost of the new heat transfer unit in addition to that of the shells especially for smaller units. In order to show substantial savings in cost, these additional appurtenances require units of larger size—and hence large areas of heat transfer surface to be eliminated. Savings are, however, very considerable in units where flash evaporations and open condensations are used as a means of heat transfer in units so large that otherwise thousands or tens of thousands of square feet of area of metallic heat transfer surface would be required.

*Open condensation on liquid other than pure condensate*

In an open condensation such as in the flow-sheet of FIGURE 3, the liquid of the cold stream may be a different fluid than the vapors resulting from the stream being cooled, especially if the liquid chosen for the cold stream allows a lower vapor pressure of the most volatile material in the warm stream at the same temperature and concentration, than does the liquid of the stream being cooled.

Thus, for example, a stream of warm water may be cooled by *open condensation* on a stream of caustic soda solution which is being heated. There will be an elevation of boiling point, as indicated above, on the right or caustic soda stream of FIGURE 3, which elevation would become less as the solution became diluted through the receiving of condensation from stage to higher stage. However, each individual stage is substantially isobaric; and the liquids leaving are usually practically in equilibrium as to pressure, i.e., the liquid being cooled and the liquid being heated have the same vapor pressure, even though the stream on the right in this case has an elevation of boiling point. Thus, the volatile liquid (water) is being cooled by a liquid which actually has a *higher temperature*. This unexpected possibility has been experimentally demonstrated; and it has been found practical with a strong caustic solution 20° F. higher in temperature than pure water, to cool the water by an additional 5° F. or even 10° F. in the one stage due to the very great tendency for the vapor pressure to be equated on both sides of the stage. Seldom can this effect be used thus so simply, because of the fact that dilution of the concentrated solution results by the condensation of water therein; and this usually is not desired. However, some corollary operations may use this interesting phenomenon in relation to other uses of this method; and other examples may be given.

One principal use of this method thus may be in cooling a stream of volatile liquid, e.g., water, to a temperature below that of the available cooling water. The cooling stream on the right side of FIGURE 3 is then selected as a solution of a material very soluble in water, and with a high elevation of boiling point. If possible, the solute should be one which has, with water, a low positive heat of solution, or preferably a negative heat of solution. Suitable materials are calcium chloride, lithium chloride, other salts of similar properties (usually forming one or more hydrates with water) which are inexpensive and relatively non-corrosive to materials of construction, as well as being stable under the conditions of operation. Organic liquids may also be used, either pure at the point of inlet to the lowest stage, or in concentrated solutions with water. Those which are suitable are those with high boiling points and great hydroscopicity such as multi-hydroxy alcohols: glycerine, diethylene glycol, triethylene glycol, etc.

The discharge of the right or cooling stream of FIGURE 3 from the top stage then passes to a concentrating evaporator where the water which has been absorbed is evaporated off; then the concentrated salt solution or organic liquid solution (possibly almost completely dehydrated) would be cooled. The methods described herein may not usually be used because of the low volatility of the solution. Thus a tubular unit would be used to give the lowest temperature which can be obtained by the available cooling water. The solution then passes back to the bottom stage to continue the cyclic cooling or refrigeration of the aqueous liquor to be chilled. This process is a system of refrigeration below the available cooling water temperature. Like all such refrigeration systems, it requires an input of energy; in this case, heat energy to reconcentrate the cooling solution.

If in the flow sheets of FIGURE 1 or 2 an aqueous stream is the volatile liquid being cooled by closed condensation, the nature of the cooler fluid circulated through the tubes on the right is immaterial. However, if the open condensation of FIGURE 3 is considered, usually the cooling stream is aqueous, or, at least, vapors of water can dissolve therein. If a water-immiscible oil is to be warmed in accomplishing the cooling of the volatile liquid, it would usually be by closed condensation, as in FIGURES 1 and 2. In some cases, however, a relatively non-volatile oil or other water immiscible liquid may be used for open condensation, as in FIGURE 3; and the water will condense on the open surfaces of the oil, without dissolving therein. It is possible to separate the condensate formed on each stage by either internal or external decantation, and remove it from the system, or it may then flow back and join the aqueous stream on the same or next lower stage, if desired. Alternately, the mixture of the two liquids, oil and condensate-water, may be passed directly to the next higher stage. The two liquids will be at the same temperature because of their intimate contact; and condensation will proceed from stage to stage, in the manner of FIGURE 3, which is already familiar.

A general principle should be noted which is important in understanding these relations. The right side of a stage of a system operating as in FIGURE 3 may actually have a higher temperature than that of the left side. However, the equilibrium partial pressure of the volatile liquid being cooled out of the liquid leaving the right side of any stage must always be at least slightly less than the equilibrium vapor pressure of the volatile liquid being cooled as it leaves the left side of the same stage. The fundamental criterion is thus the relative partial pressures of the volatile material out of the two exit streams; and as above noted, the temperatures may seemingly be reversed in some cases depending on the partial pressure relations of the liquids in the two streams.

*Gases and vapors in liquid to be cooled*

The most common dissolved material in the liquid to be chilled which will volatilize under the conditions of flash evaporation, is air or other non-condensible gas. Methods for removal of these are standard, and well known. Substantially, air-free liquid (e.g., water or its solutions) may thus be prepared before the chilling operation. Even so, it may be desirable or necessary to provide for the removal of small amounts of non-condensibles due to leakage or otherwise into the equipment comprising the several stages; and this also is a standard operation, with air-vented traps, vacuum lines and pump, etc. incorporated into the flow diagrams of FIGURES 1 and 2.

In general, the multiple flash evaporation will eliminate effectively any non-condensible gases from the liquid stream being chilled.

With open condensation, as in FIGURE 3, the non-condensible gases may be expected to be absorbed in the cooling stream, if the latter has an equal or greater solubility therefor; and particularly (a) if the amount of liquid in the stream being heated is greater than the amount in the stream being cooled, and/or (b) if the amount of non-condensible gas in the stream being cooled is considerably below the solubility limits, as may often be the case.

In some processing, the removal, or stripping, as it is usually called, of a gas or vapor from a liquid while it is being chilled is often important, and this may thus be done by operating according to FIGURE 3, with recovery of the gas or vapor in the stream being heated.

For example, in some streams of processing liquids, e.g., those encountered in the production of soda ash by the Solvay process, a small amount of ammonia present in a stream of warm aqueous liquor may be removed practically completely by heat interchanging by open condensation with colder water or other liquid having a chemical or physical ability to dissolve ammonia. The flow sheet of FIGURE 3 in these cases will allow the flash evaporation, cooling, and elimination of ammonia from the stream on the left and the condensation and adsorption of the ammonia in the stream on the right.

*System of two or more volatile liquids in the stream being cooled*

An important industrial use of this method is in cooling the so-called "slops" discharging from a beer still in the alcohol industry, at a temperature of 212–215° F. and containing from about 0.02% to 0.1% ethyl alcohol. In the usual tubular heat exchanger, the heat may be recovered; but a very large heat transfer surface is required, due to its tendency to be fouled by suspended solids or by scale formation from dissolved scale-formers, such as calcium sulfate. In any case, the alcohol content is lost. However, by operating with flash evaporation of the slops on the left of FIGURES 1, 2 or 3, and open condensation of the vapors by a cold aqueous stream on the right as in FIGURE 3, or closed condensation as in FIGURE 2, most of the alcohol otherwise wasted may be recovered.

A small amount of flash evaporation of the slops gives a vapor of a much greater concentration of alcohol; and in this range, the relative volatility of alcohol, i.e., the ratio of the concentration of alcohol in the vapors to that in the liquid is between about 12 and 20. This increases with the lower pressures of subsequent stages. The water to be used in making the mash to be fermented, or the mash itself, may be heated in cooling the alcohol-containing liquid, since the fermentation is done at a temperature above the ambient. If closed condensation is used, the feed from the fermenter to the beer still may be heated by the cooling of the slops.

With a closed condensation, as in FIGURE 2, the condensate is withdrawn, combined from the several stages and returned to the feed of the beer still. By open condensation, as in FIGURE 3, the alcohol may be condensed or absorbed into the liquid to be fermented; and thus be added immediately to the next batch of liquid being processed.

At least 95% of the alcohol otherwise wasted in the slops may be recovered in a six or seven stage heat exchanger. The concentration profile of alcohol versus stage number of such a flash evaporation operation in a seven stage unit, is diagrammed on a semi-logarithm plot, FIGURE 10. Concentrations are indicated logarithically because of their considerable range, also because the steps—representing successive decreases of concentration of alcohol from stage to stage—have been found to come out about equal to such a plot. Alcohol concentration of the hot slops entering from the discharge of a fairly efficient beer still is 0.15% by weight; and the discharge from a seven stage unit is about 0.003% alcohol (precise determinations in this low range are difficulty). The increase of alcohol in the cold water stream balances, stage by stage, the alcohol flashed from the beer, but the profile for the cold liquor concentration is not shown practically on this small scale.

In a 50,000 gallons per day fermentation alcohol plant, the loss in discharge liquid from the stills may amount to 500 gallons per day of alcohol. The saving of 95% of this, or 475 gallons per day, is substantial, and is possible in this process of heat exchanging through the simultaneous exhaustion and absorption involved in recovery from this very dilute solution. In this case, as in others, the cooling of the liquid (here slops from the stills) is especially effective since there is no heat transfer surfaces to be fouled by scale or suspended solids. As in any tubular unit, the heat recovery is important for the value of the steam saved.

The cooling of a volatile liquid containing a small amount of a second volatile liquid dissolved therein, while stripping out or recovering the second volatile liquid, is a process often met in the recovery of a small amount of volatile liquid dissolved up to its saturation limit in a layer of another volatile liquid being decanted.

While this method of cooling a volatile liquid may thus also strip simultaneously a material of greater volatility which is dissolved therein, it has been found particularly effective in this stripping action for removing a material of greater volatility which has a limited solubility in the volatile liquid being cooled, as shown by forming a second phase when present in greater than the saturation limits, e.g., in a decanter. Often also, such a stream of one liquid discharging from a decantation step (and thus separated with the material from which it is being separated by decantation) is at a temperature higher than desired and therefore retaining heat which may be recovered by this method. As is familiar from distilling practice, the relative volatility of such a volatile and slightly soluble material is very high out of the solute liquid in which it has low miscibility.

Use of method in standard absorption refrigeration

The absorption system of refrigeration uses ammonia as the carrier of heat from the lower temperature and pressure at which it is removed (i.e., from chilled brine) to the higher temperature and pressure at which it is discharged (i.e., to cooling water). It depends on: (a) the evaporation of liquid ammonia which obtains its heat of vaporization from a "low temperature heat transfer fluid," usually a circulating brine system; (b) the absorption or dissolution of the ammonia vapors by water in a strong aqua ammonia stream, which is being cooled simultaneously by what may be called a "higher temperature cooling fluid," usually cooling water; (c) the pumping of the strong aqua ammonia from the lower vapor pressure of ammonia existing in the evaporator and the absorber to the higher vapor pressure of ammonia present in the regeneration; (d) the regeneration or distillation of the ammonia from the strong aqua ammonia under higher pressure, to give also a very dilute aqua ammonia; (e) the condensation of the ammonia vapor while under this higher pressure and the cooling of the liquid ammonia condensate by passing the heat to cooling water, air or other receiver of heat; and (f) the exchange of heat between the streams of the strong and the dilute aqua ammonia.

All modifications of this system require fluid flow and processing in a series of heat exchangers, usually called "evaporator," "absorber," "exchanger," "generator" and "condenser." The operation of the first three may be improved directly and that of the last two indirectly while the entire process is made more efficient by the use of the new method of cooling of a volatile liquid because of the greater counter-current and more efficient action during heat exchange and absorption simultaneous thereto.

FIGURE 11 diagrams the flow sheet of an absorption refrigeration system using the present method in its heat exchangers. The evaporator and the absorber are assembled in one unit with fluid flows resembling those of FIGURE 3 (with some additions); the exchanger is another unit which uses the flow sheet of FIGURE 2, and the generator and the condenser may be standard units, although with less need for capacity and efficiency of exhaustion of the last ammonia from the stream of dilute aqua ammonia for reasons which will be discussed later. A standard rectifying column having bubble cap plates may be incorporated in the generator.

The liquid ammonia enters the top stage of the evaporator under the maximum pressure of about 150 pounds per square inch absolute; or if the requirements for the refrigeration effect warrant, the pressure may be reduced somewhat by a pressure-reducing valve, indicated by a cross. It evaporates from stage to stage as do the other warm, volatile liquids discussed above; in this case, however, the last of it is completely evaporated in the bottom or lowest pressure stage, at 40–50 pounds per square inch absolute pressure there.

A continuous tubular circuit is installed in such a way as to be always covered with the liquid ammonia evaporating on that stage. Through this circuit flows a low temperature heat transfer fluid, such as chilled brine, in the same direction of flow, stage to stage, of decreasing pressure as the ammonia liquid itself. The flow of the brine is indicated in the evaporator stages of FIGURE 11 by the circuit of dashed lines pointing first right and then left *on alternate stages*. This brine gives up its heat and is chilled in passing heat to evaporate the liquid ammonia. The parallel flow of liquid ammonia and brine with the tubular path of the chilled brine allows a temperature drop from the liquid ammonia on each stage to the tube carrying the chilled brine, because of the downward steps of pressure—and boiling temperature of the ammonia—from top-pressure stage to bottom-pressure stage.

While a chilled brine system is indicated as the source of the heat being removed in this refrigeration cycle, either air (for comfort) or other cooling purposes, water being frozen to ice, or other body of a low temperature heat transfer fluid may have its heat removed and thus benefit from the refrigeration effect. The most common means of transferring the cooling effect is with a brine or other aqueous solution of a sufficient concentration of a material to depress the freezing point (e.g., common salt, calcium chloride, glycerine, methanol, or alcohol).

The vapors pass from left to right of each stage, as in previous examples of the use of this method. The right side of each stage is an absorber or, with all stages in series, a sequence of absorber stages which are counter-current in pressures and temperatures to those of the flow of liquid ammonia evaporating in the evaporator side of the unit. At the bottom stage of the absorber, practically pure water enters for absorption of ammonia vapor. This becomes a dilute aqua ammonia which is passed upwardly from stage to stage on the absorber side as the cooling or absorber liquid. As indicated above, it is sprayed or otherwise dispersed so that there is ample surface for contact and absorption of the vaporous ammonia, and simultaneous transfer of the heat of condensation and absorption. The aqua ammonia increased substantially in temperature from the bottom stage to the top stages; and this is accomplished because of the different pressures from stage to stage, as on the left side, the evaporator side of the stage.

Heat may be removed from this aqua ammonia in the absorber by a stream of cooling water in a tubular system which is covered by the liquid on each stage in the same way as was the brine system in the evaporator side of the stage. This is likewise indicated in FIGURE 11 by a circuit of dashed lines pointing first left and then right on alternate stages. The cooling water supplied may be that already slightly warmed by use in the condenser, depending on its supply and cost as well as its available temperature.

The similarity, as well as considerable difference, from the heat removal action in FIGURE 5, should be noted; since the cooling water coil submerged in liquid on the stages of the absorber of FIGURE 11, appears comparable to the closed tubular condenser passing through the right side of the stages of FIGURE 5. The considerable difference depends, however, on the fact that in the absorber of FIGURE 11, the ammonia vapors in each stage are at a *lower temperature than is the liquid in the coils for cooling water*, to which the heat of condensation of these vapors is being passed. Thus, there could be no condensation if the cooling water passed in tubes passing through the vapor space, as in FIGURE 5. The dilute aqua ammonia absorbs or condenses the ammonia vapors at a higher temperature than the temperature of the vapors; and it can do this because of the low vapor pressure of ammonia out of water. In absorbing this heat, the aqua ammonia comes to a higher temperature than the cooling water and thus passes the heat to a *higher temperature* than that of the vapors from which the heat is received. If the cooling water tubes are in the vapor space of the stage, as in FIGURE 5, their greater temperature would simply pass heat *in the reverse direction* to the ammonia vapors to superheat them, and the desired cooling effect on the dilute aqua ammonia stream would be lost.

While ordinary cooling water is indicated, as the sump to which heat of condensation and absorption is discharged from the absorber, some other so-called "higher temperature cooling fluid" may be used. ("Higher temperature" indicates a distinction from the lower temperatures of the brine circulated on the evaporator side of the system.) Air or other gas may also be used; and for convenience of arrangement, in many units a liquid boiling at a suitable pressure removes the heat of condensation of the ammonia at latent heat of vaporization, which is passed through a condenser to another gas or liquid for discharge.

The stream of strong aqua ammonia leaving the top of the absorber is at a relatively low temperature, 80° to 110° F., compared to the temperature of the stream of dilute aqua ammonia leaving the bottom of the generator, 230° to 240° F.; and these two streams are now flowed counter-currently to each other in the exchanger, which is identical in flows with FIGURE 2. Provision is made only for discharge of condensate from the traps on the right of each stage, and subsequent collection thereof. Dilute aqua ammonia has only a small amount of ammonia dissolved therein as it leaves the bottom of the generator, and this is effectively stripped out in the exchanger. The condensates from the several stages carry this ammonia—greatly concentrated. They are collected and added to the stream of strong aqua ammonia leaving the high temperature stage of the absorber.

As in the usual absorption refrigeration system, there is shown in FIGURE 11 a pump to force the strong aqua ammonia from the pressure of the exchanger to that of the generator. In the present system, the high concentration of ammonia in the strong aqua ammonia and its relatively high temperature when leaving the exchanger may make it desirable to locate the pump between the absorber and the exchanger rather than between the exchanger and the generator as shown in FIGURE 11. (The tubes on the right side of the exchanger would then have strong aqua ammonia under the higher pressure of the generator.) A second pump would then be in the position and piping relation shown for the present pump, or a much smaller pump could be used, to force the condensate of the several stages of the exchanger up to the higher pressure of the generator.

The generator operates at 150 pounds per square inch absolute; and the ammonia is distilled therein from the water. A standard rectifying tower of from 5 to 12 bubble cap or similar plates is used to give substantially anhydrous ammonia at the top. The condenser condenses and cools it at the lowest temperature possible with ordinary cooling water in the normal manner. (This cooling water may then be passed to the cooling coils of the absorber, if desired, depending on its temperature.) A small amount of the liquified substantially pure ammonia is returned as reflux to the top of the rectifying column to hold down water from the heat of the column. However, most of the liquified ammonia passes back to the top stage of the evaporator by passing through an expansion valve indicated by a small cross in FIGURE 11.

The number of stages in the evaporator-absorber may be 6 to 8, and the same number may be used in the exchanger. Less attention than with the usual system need be paid to distilling all the ammonia out of the dilute aqua ammonia leaving the generator, since an excellent stripping action is achieved in the exchanger; and this is described above.

As in other example of the use of this method, air or other non-condensable gases are removed by standard methods to allow the operations to proceed unimpeded by them.

The use of concurrent tubular heat exchanger to the streams in both the evaporator and absorber sides of the stages of this combined unit represents a modification of the present method of cooling volatile liquid material; in this case, substantially pure ammonia, by evaporation at successively lower pressures. Here, both the stream being cooled, and another concurrently flowing stream (the brine in a separate tubular system) is cooled by this evaporating action.

It should be noted, also, in this particular embodiment of the method, that the entire amount of the stream of liquid being cooled is evaporated during the cooling operation, in this case due not only to the flash evaporation, but also to the supply of heat from the brine being chilled, the chilling of which is the function of the entire operation.

There is a large amount of heat transferred from the evaporator stages to the absorber stages, due to the latent heat of condensation and the heat of solution of the liquid ammonia in being absorbed into the aqueous ammonia liquor. This heat is received there as sensible heat as shown by the increase of temperature of the aqua ammonia stream in the open condensation; and much of this sensible heat received in the aqua ammonia is immediately transferred to, and causes a simultaneous heating of, the cooling water, starting with the lower temperature and pressure of the lower stage and going up to the higher temperature and pressure of the upper stage. Thus, the temperature of the aqua ammonia in the absorber does not change very much from bottom to top, but the pressure is increased from 40 to 100 pounds per square inch absolute; and the concentration also gos up from 0% to almost 60% ammonia.

As in each other example of this method, the substantially isobaric condition across each stage is maintained with accompanying heat transfer and flow of vapors left to right; in this case that represented by the evaporation and then absorption of ammonia.

An improvement in the thermal efficiency of an absorption refrigeration system is made possible by the use of this method of simultaneous heat interchange and gas absorption. The evaporator-absorber is a counter-current combination of a heat transfer and evaporation-absorption as indicated in FIGURE 11. This multi-stage counter-current action requires a lesser amount of water for the ammonia absorption and allows a higher concentration of ammonia in the strong aqua ammonia than is possible with the single stage system previously used. The standard unit can have no possible counter-current action in either the heat transfer or evaporation-absorption operations taking place in these two operations hitherto kept quite separated in both the usual continuous process and also the less common batch process. There is a higher ammonia concentration in the strong aqua ammonia and a lesser amount of water must be circulated in the improved method. This means that a smaller amount of heat is required in the generator per ton of refrigeration than by a conventional unit.

In the exchanger, which is a much less important example of the present method of heat transfer in the absorption refrigeration system than is the evaporator-absorber, the interesting factor is that simultaneously with heat exchange there is a stripping of the small amount of ammonia in the dilute material leaving the generator, thus preparing the water for the greatest effectiveness in its absorption of the ammonia in the absorber.

As in the every other use of this method, the arrangement of the necessary equipment may be varied, depending on mechanical design considerations, but without departing from the basic flow sheet or method herein described. Provisions must be made for minimizing heat losses and gains in the several parts of the system and particularly heat conduction through walls of the absorber to the evaporator side of the stages if built in one unit.

These several units of the refrigeration system may be designed thus as multi-stage heat exchangers, as indicated. They may be built compactly either as cylindrical towers by placing one on top of the other or as horizontal cylinders. This gives advantages in the structural design which will be obvious to those familiar with the fabrication of such systems, normally made as a multiplicity of individual vessels.

The following is claimed as the invention:
1. The method of cooling a first liquid stream containing a volatile liquid which comprises the following steps:
   (a) passing the said first liquid stream through a series of three or more stages, each of a successively lower pressure;

(b) flash evaporation of a part of said volatile liquid from said first liquid stream in each of said stages with consequent cooling thereof;
(c) passing through another part of each of the said series of stages, counter-currently to the order of the flow of said first liquid stream, a second liquid stream quite different from that of first liquid stream, which second liquid stream is at a lower temperature in each stage than is the said first liquid stream on the same stage; wherein the said second liquid stream discharges on each stage into elements of open flow with large surface areas of droplets, films, or streams exposed to the vapors formed in said flash evaporation; and said elements of open flow are then allowed to flow together to become a stream which is forced to the stage of next higher pressure, wherein the process is repeated;
(d) condensing substantially all of the vapors formed by said flash evaporation of said volatile liquid in said first liquid stream, said vapors having a temperature no higher than that of said first liquid stream on the same stage, and said condensing of substantially all of the said vapors formed on one stage being accomplished in a single contacting on the same stage with the said second liquid stream in elements of open flow with large surface areas exposed, with consequent
(e) heating of said second liquid stream.

2. The method of cooling a first liquid stream, a solution of a substantially non-volatile material in a volatile liquid, which comprises the following steps:
(a) passing the said first liquid stream through a series of three or more stages, each of a successively lower pressure, which pressure is slightly lower than the vapor pressure of said volatile liquid when pure and at the temperature at which the solution leaves that particular stage;
(b) flash evaporation of a part of said volatile liquid from said first liquid stream in each of said stages with consequent cooling thereof;
(c) passing through the said series of stages, counter-currently to the order of flow of said first liquid stream, a second liquid stream containing the same said volatile liquid of the said first liquid stream; which second liquid stream is discharged into each stage in elements of open flow with large surface areas of droplets, films, or streams exposed to the vapors formed in said flash evaporation; and said elements of open flow are then allowed to flow together to become a stream which is forced to the stage of next higher pressure, wherein the process is repeated;
(d) condensing substantially all of the vapors formed by said flash evaporation of volatile liquid from said first liquid stream on the said large surface areas exposed of said second liquid stream in open flow, said vapors having a temperature no higher than that of said first liquid stream on the same stage, and said condensing of substantially all of the said vapors formed on one stage being accomplished in a single contacting on the same stage with the said second liquid stream in elements of open flow; with consequent
(e) heating of said second liquid stream up to a temperature as it leaves a stage which is not higher than the temperature of the second liquid stream which is in equilibrium with the vapor pressure of the said volatile liquid out of the said first liquid stream as it leaves the same stage.

3. The method of cooling a first liquid stream containing a volatile liquid which comprises the following steps:
(a) passing the said first liquid stream through a series of three or more stages each of a successively lower pressure;
(b) flash evaporation of a part of said volatile liquid from said first liquid stream in each of said stages with consequent cooling thereof;
(c) passing through another part of each of the said series of stages counter-currently to the order of the flow of said first liquid stream, a second liquid stream quite different from that of said first liquid stream, which second liquid stream is at a lower temperature in each stage than is the said first liquid stream on the same stage; wherein the said second liquid stream is enclosed within the walls of a passageway, which walls will allow condensation of vapors thereon and heat exchange from outside to the said second liquid stream at a lower temperature inside; thereby
(d) condensing substantially all of the vapors formed by said flash evaporation of said volatile liquid in said first liquid stream; wherein the condensate formed by the said condensation of vapors of said volatile liquid in said first stream flows from the said walls of the passageway for said second liquid streams; and said condensate is allowed to return to the said first liquid stream on the same stage; with consequent
(e) heating of said second liquid stream.

4. The method of cooling a first liquid stream containing a volatile liquid which comprises the following steps:
(a) passing the said first liquid stream through a series of three or more stages each of a successively lower pressure;
(b) flash evaporation of a part of said volatile liquid from said first liquid stream in each of said stages with consequent cooling thereof;
(c) passing through another part of each of the said series of stages counter-currently to the order of the flow of said first liquid stream, a second liquid stream quite different from that of first liquid stream, which second liquid stream is at a lower temperature in each stage than is the said first liquid stream on the same stage; wherein the said second liquid stream is enclosed within the walls of a passageway, which walls will allow condensation of vapors thereon and heat exchange from outside to the said second liquid stream at a lower temperature inside; thereby
(d) condensing substantially all of the vapors formed by said flash evaporation of said volatile liquid in said first liquid stream; wherein the condensate formed by the said condensation of vapors of said volatile liquid in said first liquid stream flows from the said walls of the passageway for said second liquid stream; and said condensate is allowed to return to the said first liquid stream on the adjacent stage of next lower pressure; with consequent
(e) heating of said second liquid stream.

5. The method of treating a first liquid stream of a solution comprising a volatile liquid and a liquid of much greater volatility, whereby said first stream of solution is cooled and, at the same time, partially exhausted of said liquid of much greater volatility, which comprises the following steps:
(a) passing the said first liquid stream through a series of three or more stages at successively lower pressures;
(b) flash evaporation of a part of the said volatile liquid and simultaneous exhaustion as vapors of a substantial amount of the said liquid of much greater volatility from said first liquid stream in each of said stages, with consequent cooling of the residual amount of said first liquid stream leaving the same stage;
(c) passing through another part of each of the said series of stages counter-currently to the order of the flow of said first liquid stream, a second liquid stream of another fluid within the walls of a passageway, which walls will allow condensation of vapors thereon and heat exchange from outside the passageway to the said second liquid stream, which is always at a lower temperature in each stage than is said first liquid stream;

(d) condensing substantially all of the vapors formed by said flash evaporation of the said volatile liquid and by the said exhaustion of the said liquid of much greater volatility on the walls of said passageway, said vapors having a temperature no higher than that of said first stream of a volatile liquid on the same stage; and (e) removing from the system the condensate of said condensation separately from each stage to a lower pressure and through a constriction which prevents the discharge of vapors, said condensate separately removed from a stage having a higher concentration of the said liquid of much greater volatility than is its concentration in the said residual amount of said first liquid stream leaving the same stage.

6. The method of treating a first liquid stream of a solution comprising a volatile liquid and a liquid of much greater volatility, whereby said first stream of solution is cooled, and, at the same time, partially exhausted of said liquid of much greater volatility, which comprises the following steps:

(a) passing the said first liquid stream through a series of three or more stages at successively lower pressures;

(b) flash evaporation of a part of the said volatile liquid, and simultaneous exhaustion as vapors of a substantial amount of the said liquid of much greater volatility from said first liquid stream in each of said stages, with consequent cooling of the residual amount of said first liquid stream leaving the same stage;

(c) passing through another part of each of said series of stages counter-currrently to the order of the flow of said first liquid stream, a second liquid stream discharging on each stage in elements of open flow with large surface areas of droplets, films, or streams exposed to the vapors formed in said flash evaporation, which second liquid stream has, at the temperature at which it leaves each stage, a lower value of the equilibrium vapor pressure of the said liquid of much greater volatility present in the first stream than does the said first liquid stream at the temperature at which said first stream leaves the same stage; wherein the said elements of open flow expose large surface areas of said second liquid to the vapors formed by said flash evaporation and said simultaneous exhaustion; and said elements of open flow are then allowed to flow together to become a stream which is forced to the stage of next higher pressure, wherein the process is repeated; and (d) condensing and absorbing on the said large surface areas exposed of the said second liquid stream, which discharges on each stage as elements of open flow, substantially all of the vapors which have been formed by the flash evaporation of part of the said liquid of much greater volatility and by the simultaneous exhaustion of the said liquid of much greater volatility in the particular stage from the said first liquid stream; said condensation and absorption of substantially all of the vapors formed from the said first liquid stream being accomplished in a single contacting with the said second liquid stream in open flow; and said vapors being at a temperature no higher than that of said first liquid on the same stage.

7. The method of claim 5 in which the said liquid of much greater volatility in the said first liquid stream is one which has a limited solubility with said volatile liquid in said first liquid stream, and which may form another liquid phase if the amount mixed with the said volatile liquid exceeds the solubility limit.

8. The method of cooling a first liquid stream containing a volatile liquid which comprises the following steps:

(a) passing the said first liquid stream through the evaporator side of each of a series of three or more stages having successively lower vapor pressures of said volatile liquid therein by passing said first liquid stream through constrictors between the stages, while said first liquid stream is in heat transfer relation with a body of heat transfer fluid to be cooled, which fluid is being circulated at a higher temperature at any stage than is the said first liquid stream;

(b) flash evaporating a part of said volatile liquid in said first liquid stream with consequent cooling thereof in each of the said stages of successively lower pressures;

(c) removing heat from said body of heat transfer fluid to be cooled while simultaneously using this heat to vaporize a part of said volatile liquid in said first liquid stream;

(d) passing through another part, the absorber part of each of the said series of stages, counter-currently to the order of flow of said first liquid stream, a second liquid stream in open flow of another liquid, the absorbing liquid; wherein the said open flow exposes to the vapors formed in said flash evaporation, large surface areas of droplets, films, or streams of said absorbing liquid, and the elements of open flow are then allowed to flow together to become a stream which is forced against the higher pressure of each successive stage in the order of flow of said absorbing liquid; and which absorbing liquid has, as it leaves each stage, an equilibrium vapor pressure of the said volatile liquid below that of the vapor pressure of the said volatile liquid in the said first liquid stream as it leaves the same stage; while said second stream of absorbing liquid is in heat transfer relation with a body of circulating cooling fluid which is being heated;

(e) condensing and adsorbing in the absorber part of each stage substantially all of the vapors formed by said flash evaporation of said volatile liquid from said first liquid stream, said vapors being at a temperature no higher than that of said first liquid stream on the same stage; wherein said condensing and absorbing is accomplished in a single contacting with the large exposed surface areas of said second liquid stream of absorbing liquid; with consequent (f) adding of heat to said second liquid stream of absorber liquid in each stage; and (g) transferring of heat from said second liquid stream of absorber liquid in each stage to said body of circulating cooling fluid which is being heated.

9. The method of claim 8, wherein the said body of heat transfer fluid to be cooled is water which is being frozen to ice, and which is giving up its sensible heat above the freezing point and its latent heat of freezing to supply heat to vaporize a part of the said voltaile liquid in said first liquid stream.

10. The method of claim 8, wherein the said body of said circulating cooling fluid is a liquid which is being boiled, because of the said heat transfer relation by which the heat of the vapors, coming from the evaporation of the said volatile liquid in said first liquid stream, is transferred to the said second stream of absorbing liquid by the condensation and absorption of said vapors, thereby heating said absorbing liquid and hence said liquid which is being boiled.

11. The method of cooling a first liquid stream containing a volatile liquid which comprises the following steps:

(a) passing the said first liquid stream through a series of three or more stages each of a successively lower pressure;

(b) flash evaporation of a part of said volatile liquid in said first liquid stream in each of said stages, with consequent cooling thereof;

(c) passing through another part of each of the said series of stages, counter-currently to the order of the flow of said first stream, a second liquid stream of a solution in the same volatile liquid of a substantially non-volatile material which is dissolved in a concentration sufficiently high to produce a substantial elevation of boiling point of said volatile liquid in said second liquid stream; wherein said second liquid stream discharges on each stage into elements of open flow with large surface areas exposed, of droplets, films, or streams exposed to the vapors formed in said flash evaporation, and said elements of open flow are then allowed to flow together to be forced as a stream to the stage of the next higher pressure, wherein the process is repeated; thereby (d) condensing substantially all of the vapors formed by said flash evaporation of said volatile liquid from said first stream in a single contacting with the large exposed surfaces of said second liquid stream of a solution; said vapors having a temperature no higher than that of said first liquid stream on the same stage; with consequent (e) heating of said second liquid stream of solution which has a concentration of said substantially non-volatile material up to a temperature as it leaves a stage which is not higher than the temperature of the second liquid stream which is in equilibrium with the vapor pressure of the said volatile liquid out of the said first liquid stream as it leaves the same stage.

12. The method of cooling a first liquid stream of solution in a volatile liquid of a lower concentration of a substantially non-volatile material which produces a substantial elevation of boiling point of the volatile liquid in the solution, said elevation of boiling point being greater at higher concentration of said material dissolved, which includes the following steps:

(a) passing the said first liquid stream through a series of three or more stages, each of a successively lower pressure, which pressure is silghtly lower than the vapor pressure of the said volatile liquid when pure at the temperature a which the solution leaves that particular stage;

(b) flash evaporation of a part of the volatile liquid of said liquid first stream in each of said stages with consequent cooling of said first liquid stream;

(c) passing through the said series of stages, counter-currently to the order of flow of said first liquid stream, a second liquid stream of solution of the same substantially non-volatile material in the same liquid as in said first stream, but in higher concentration and therefore with a higher elevation of boiling point; wherein the said second liquid stream of solution is discharged on each stage into elements of open flow with large surface areas of droplets, films, or streams exposed to the vapors formed in said flash evaporation, and said elements of open flow are then allowed to flow together to become a stream which is forced to the stage of next higher pressure, wherein the process is repeated;

(d) condensing substantially all of the vapors formed by said flash evaporation of said first liquid stream in a single contacting with the large surface areas exposed of said second liquid stream in open flow; said vapors having a temperature no higher than that of said first stream of liquid on the same stage; with consequent (e) heating of said second liquid stream up to a temperature as it leaves a stage which is not higher than the temperature of the second liquid stream which is in equilibrium with the vapor pressure of the said volatile liquid out of the said first liquid stream as it leaves the same stage.

References Cited by the Examiner

UNITED STATES PATENTS

| | | | |
|---|---|---|---|
| 1,884,939 | 10/1932 | Wessblad | 62—101 |
| 2,182,453 | 12/1939 | Sellew | 62—79 |
| 2,197,201 | 4/1940 | Anderson | 62—148 |
| 2,560,790 | 7/1951 | Coons | 62—110 |
| 2,749,094 | 6/1956 | Lewis et al. | 165—1 |
| 2,908,618 | 12/1959 | Bethon | 202—147 |
| 2,986,906 | 6/1961 | Stubblefield et al. | 62—487 |
| 3,101,595 | 8/1963 | Peters et al. | 60—67 |
| 3,126,720 | 3/1964 | Stubblefield et al. | 62—476 |
| 3,203,464 | 8/1965 | Kingma | 159—2 |

ROBERT A. O'LEARY, *Primary Examiner.*